United States Patent
Molina Agradano et al.

(10) Patent No.: US 11,820,353 B2
(45) Date of Patent: Nov. 21, 2023

(54) AIRCRAFT AUTOMATIC BRAKING SYSTEM

(71) Applicant: SAFRAN LANDING SYSTEMS, Vélizy-Villacoublay (FR)

(72) Inventors: Maria Belen Molina Agradano, Moissy-Cramayel (FR); Louis Christian Risselin, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 310 days.

(21) Appl. No.: 16/856,944

(22) Filed: Apr. 23, 2020

(65) Prior Publication Data
US 2020/0339085 A1 Oct. 29, 2020

(30) Foreign Application Priority Data
Apr. 25, 2019 (FR) ...................................... 1904389

(51) Int. Cl.
| | |
|---|---|
| *B60T 8/32* | (2006.01) |
| *B60T 7/12* | (2006.01) |
| *B60T 8/17* | (2006.01) |
| *B60T 8/88* | (2006.01) |
| *B64C 25/44* | (2006.01) |

(52) U.S. Cl.
CPC ................ *B60T 8/325* (2013.01); *B60T 7/12* (2013.01); *B60T 8/1703* (2013.01); *B60T 8/88* (2013.01); *B64C 25/44* (2013.01)

(58) Field of Classification Search
None
See application file for complete search history.

(56) References Cited

U.S. PATENT DOCUMENTS

| | | | |
|---|---|---|---|
| 3,920,204 | A | 11/1975 | Bissell et al. |
| 2013/0197727 | A1 | 8/2013 | Muller et al. |

(Continued)

FOREIGN PATENT DOCUMENTS

| | | |
|---|---|---|
| EP | 2620363 A1 | 7/2013 |
| EP | 3115266 A1 | 1/2017 |
| GB | 1246926 A | 9/1971 |

OTHER PUBLICATIONS

Rapport de Recherche Préliminaire, mailed Jan. 17, 2020, issued in corresponding French Application No. 1904389, filed Apr. 25, 2019, 2 pages.

*Primary Examiner* — Adam D Tissot
(74) *Attorney, Agent, or Firm* — Christensen O'Connor Johnson Kindness PLLC

(57) ABSTRACT

An aircraft automatic braking system, comprising: a first functional module arranged in order to implement a state machine that includes a first branch comprising first states corresponding to a landing of the aircraft, a second branch comprising second states corresponding to a rejected take-off of the aircraft, and transitions, the first states, the second states and the transitions being defined independently of deceleration rates; a second functional module arranged in order to define a target deceleration of the aircraft at least on the basis of the deceleration rates and a current state of the state machine; and a third functional module arranged in order to define, at least on the basis of the current state and the target deceleration, an automatic braking command in order to control actuators of wheel brakes of the aircraft.

16 Claims, 5 Drawing Sheets

(56) References Cited

U.S. PATENT DOCUMENTS

| | | | |
|---|---|---|---|
| 2014/0257601 A1* | 9/2014 | Horne | B64D 45/04 |
| | | | 701/16 |
| 2018/0122250 A1* | 5/2018 | Wapenski | B64C 25/426 |
| 2018/0201367 A1* | 7/2018 | Georgin | B64C 25/46 |
| 2020/0180781 A1* | 6/2020 | Mckeown | G08G 5/0026 |

* cited by examiner

AIRCRAFT AUTOMATIC BRAKING SYSTEM

FIELD OF THE DISCLOSURE

Embodiments of the disclosure relate to the field of aircraft automatic braking systems.

BACKGROUND

An aircraft conventionally includes a system for braking certain wheels of the aircraft, which are called "braked wheels". The braking system comprises a plurality of brakes each suitable for braking a braked wheel. Each brake includes friction members, for example a stack of carbon discs, and actuators that apply a braking force to the friction members in order to brake the braked wheel and thus slow the aircraft. The actuators are generally hydraulic or electromechanical actuators.

An automatic braking, or autobrake, function is implemented in an aircraft comprising such a braking system. The automatic braking function automatically controls an automatic braking command used to control the brake actuators, so as to impart to the aircraft a selected deceleration rate without intervention by the pilot.

The selected deceleration rate can be a particular rate chosen by the pilot from a plurality of predetermined deceleration rates, or a deceleration rate calculated dynamically during landing as a function of the distance between the aircraft and a selected exit taxiway, or a maximum deceleration rate permitted by the automatic braking function in certain specific scenarios such as a rejected take-off or the possibility of overrunning the runway during a landing.

With reference to FIG. 1, in some aircraft, the automatic braking system 0 is implemented by a first functional module 1 that determines an automatic braking status Sab, and by a second functional module 2 that calculates the automatic braking command Comm as a function of the automatic braking status Sab.

With reference to FIG. 2, the automatic braking status is defined by a state machine 3. The automatic braking status corresponds to the current state, i.e. at the present moment, in real time, of the state machine 3.

The state machine 3 includes as many branches 4 as there are deceleration rates defined in the automatic braking function. Here, the state machine 3 thus includes four branches 4, which each comprise several states 5 defined as a function of a deceleration rate. The branch 4a is associated with a low deceleration rate, the branch 4b is associated with a medium deceleration rate, the branch 4c is associated with a high deceleration rate, and the branch 4d is associated with a maximum deceleration rate.

This manner of achieving the automatic braking function raises a number of difficulties.

As the states 5 each depend on a deceleration rate value, changing the deceleration rates or adding new ones is complicated, as it involves changing all of the states 5.

In addition, it is known that separate deceleration rate values are associated with each type or family of aircraft (for example A320, A340, A380, A350). These values depend on the specific features of the aircraft. Again, as the states 5 of the state machine 3 are defined as a function of the deceleration rate values, it is imperative that all of the states 5 be changed in order to adapt a state machine 3, initially provided for one type of aircraft, to another type of aircraft.

In addition, defining the state machine 3 requires complex specifications, containing multiple duplicates, as most of the transition conditions 6 are common to all of the branches 4. Such specifications are difficult to retain and very complicated to amend.

SUMMARY

An object of the disclosure is that of providing a simpler automatic braking function that is easier to retain, amend and adapt as a function of the type of aircraft on which it is used.

In order to achieve this aim or others, an aircraft automatic braking system is proposed. In one embodiment, the system includes means for acquiring deceleration rates suitable for being imparted to the aircraft by the automatic braking system, and separate functional modules comprising:

a first functional circuit or module arranged in order to implement a state machine that includes a first branch comprising first states corresponding to a landing of the aircraft, a second branch comprising second states corresponding to a rejected take-off of the aircraft, and transitions, the first states, the second states and the transitions being defined independently of the deceleration rates;

a second functional circuit or module arranged in order to define a target deceleration of the aircraft at least on the basis of the deceleration rates and a current state of the state machine, the current state being either one of the first states or one of the second states;

a third functional circuit or module arranged in order to define, at least on the basis of the current state and the target deceleration, an automatic braking command in order to control actuators of wheel brakes of the aircraft.

The first functional module of the automatic braking system according to an embodiment of the disclosure thus defines a current state or automatic braking status. The second functional module according to an embodiment of the disclosure defines the target deceleration. In an embodiment, the first functional module and the second functional module are two separate functional modules, so that it is possible to change one without changing the other. The first states, the second states and the transitions do not depend on the deceleration rates, so that it is possible to change the deceleration rates without changing the state machine. The state machine only comprises two branches, and is therefore relatively simple to specify and design.

In an embodiment, the automatic braking system is arranged in order to acquire external parameters generated outside the automatic braking system and representative of a state of the aircraft, the transitions depending on first conditions defined at least on the basis of the external parameters.

In an embodiment, the second functional module is arranged in order to define the target deceleration by also using the external parameters.

In an embodiment, the automatic braking system also comprising a fourth functional circuit or module arranged in order to produce consolidated parameters at least on the basis of the external parameters and a selected deceleration rate chosen from the deceleration rates, the state machine comprising at least one transition depending on second conditions defined at least on the basis of the consolidated parameters.

In an embodiment, the first states comprise a deactivated state, a first activated state, a pre-engaged state, a first engaged state, and a fully engaged state.

In an embodiment, the second states comprise the deactivated state, a second activated state, and a second engaged state.

In an embodiment, the transition from the deactivated state to the first activated state occurs when the aircraft is in flight before the landing of the aircraft and a pilot of the aircraft selects a first automatic braking mode corresponding to the landing of the aircraft.

In an embodiment, the transition from the first activated state to the pre-engaged state occurs when the aircraft touches down, and differences between speeds of most of the wheels of the aircraft and a speed of the aircraft are less than or equal to a first pre-determined speed threshold, and an automatic braking order is received.

In an embodiment, the transition from the pre-engaged state to the first engaged state occurs when the aircraft is stabilized on the ground.

In an embodiment, the transition from the pre-engaged state or the first engaged state to the fully engaged state occurs when a risk of the aircraft overrunning the runway is detected, and in which a transition from the fully engaged state to the first engaged state occurs when the risk disappears.

In an embodiment, the transition from the deactivated state to the second activated state occurs before a take-off run of the aircraft when a pilot of the aircraft selects a second automatic braking mode corresponding to the rejected take-off the aircraft.

In an embodiment, the transition from the second activated state to the second engaged state occurs when an automatic braking order is received, and a speed of the aircraft is greater than or equal to a second pre-determined speed threshold.

In an embodiment, the transition from the pre-engaged state or the first engaged state or the fully engaged state or the second engaged state to the deactivated state occurs when a pilot of the aircraft exerts pressure on brake pedals that is greater than a pre-determined pressure threshold, or if the aircraft takes off and landing gear of the aircraft is no longer touching the ground.

In an embodiment, the transition from any particular state belonging to the first states or to the second states to the deactivated state occurs when a fault in equipment contributing to the implementation of the automatic braking occurs, or when a pilot of the aircraft manually deactivates automatic braking.

The disclosure will be more clearly understood in light of the following description of one or more non-limitative embodiments of the disclosure.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In examples of the disclosure, the braking system is suitable for implementation in a vehicle, such as an airplane, that includes a hydraulic braking system.

In an embodiment, the hydraulic braking system comprises a plurality of brakes each suitable for braking a braked wheel of the airplane. Each brake includes a plurality of hydraulic actuators. The hydraulic braking system also comprises one or more braking computers or circuits and a hydraulic circuit. When a pilot of the airplane produces a manual braking instruction by pressing on a brake pedal in the cockpit, the braking computer(s) convert this manual braking instruction into a manual braking command that controls the hydraulic actuators of the brakes of the braked wheels via the hydraulic circuit. Here, the manual braking command is a pressure command.

In an embodiment, the airplane also comprises an automatic braking system, which is connected to and works in conjunction with the hydraulic braking system. The automatic braking system makes it possible to impart to the airplane and maintain a selected deceleration rate without any intervention by the pilot.

In some embodiments of the disclosure, the automatic braking system comprises one or more computers or circuits, e.g. one or more items of equipment comprising electrical components and hardware, including processing components (micro-controllers, processors, FPGAs, etc.), on which one or more pieces of software are programmed.

Figure 1:
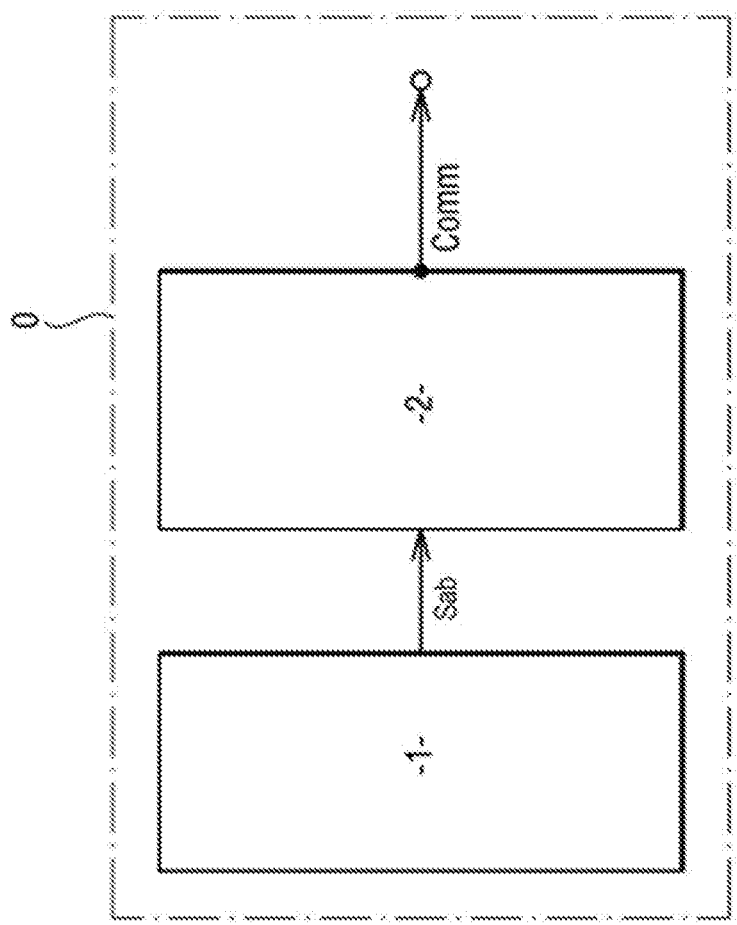
FIG. 1 shows a first functional module and a second functional module of an automatic braking function of the prior art.
Figure 2:
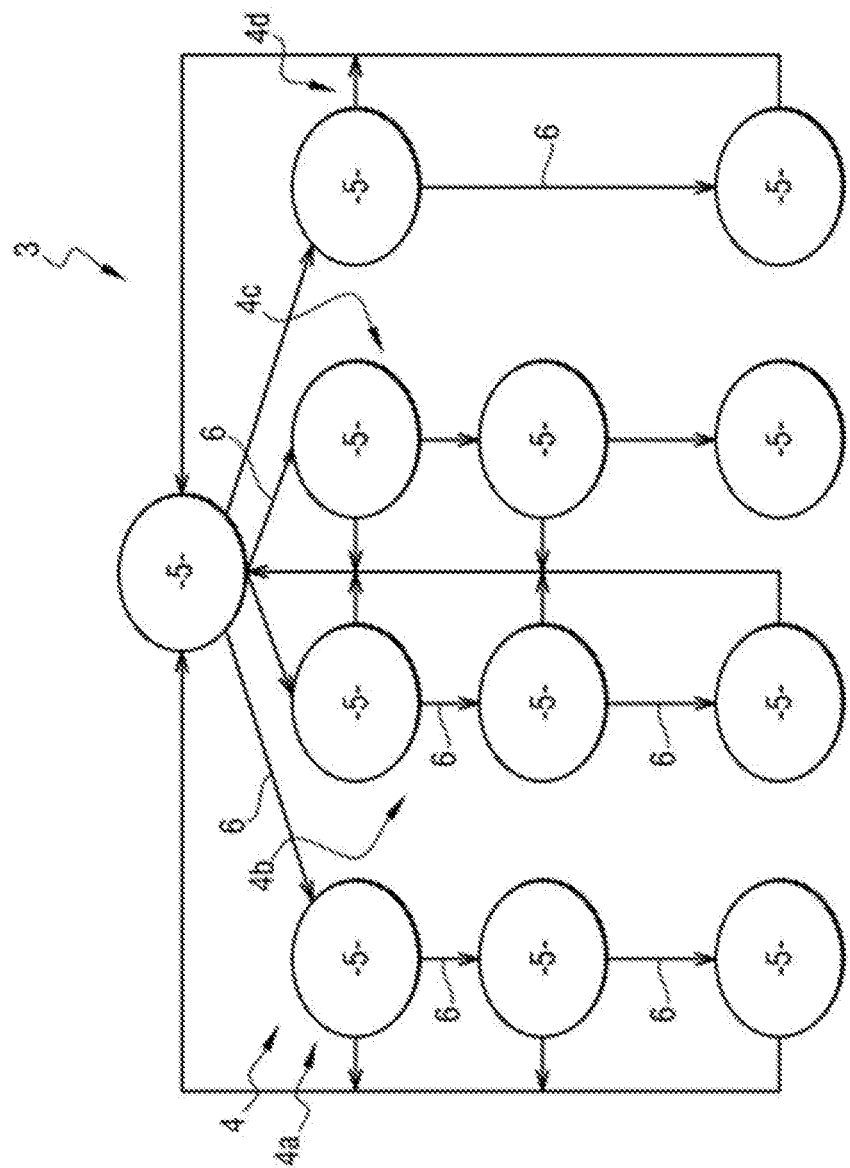
FIG. 2 shows a state machine of the automatic braking function of the prior art.
Figure 3:
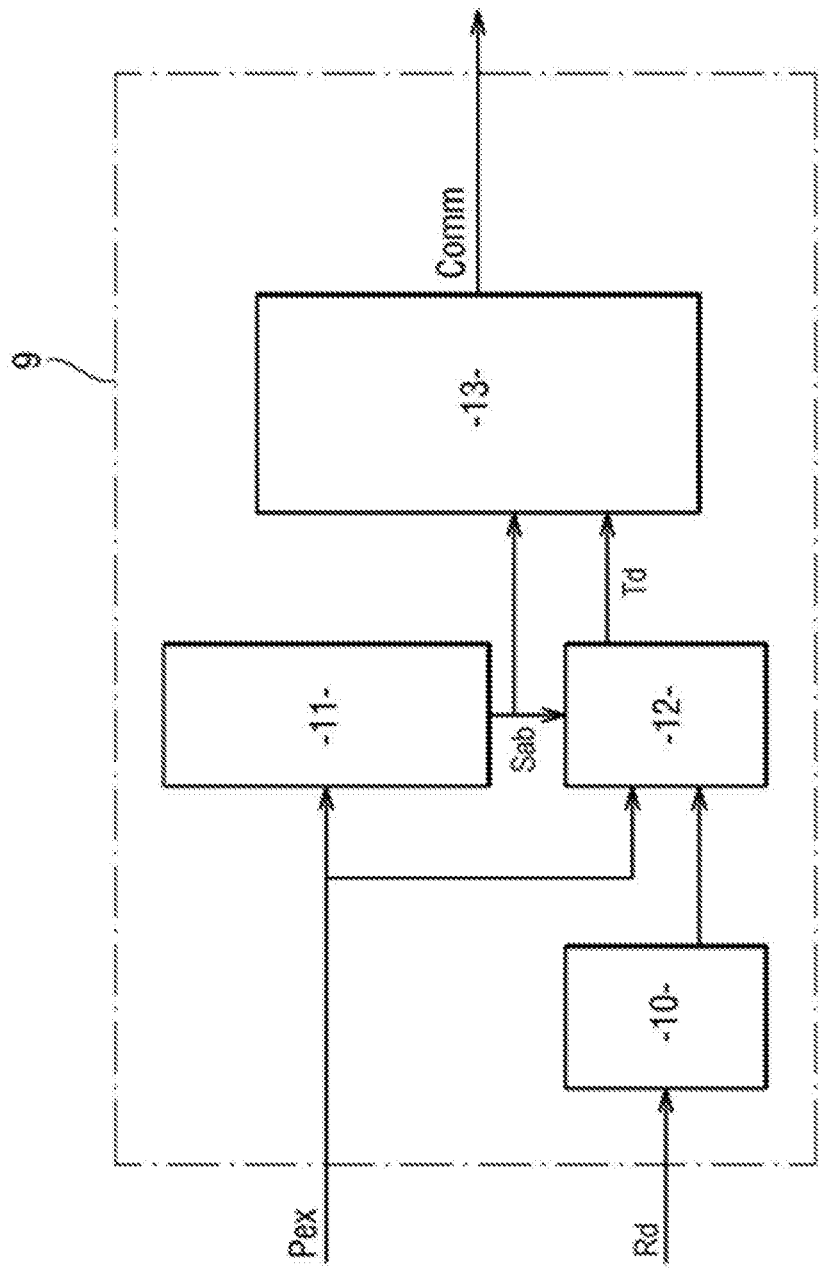
FIG. 3 shows an automatic braking system according to an embodiment of the disclosure.

With reference to FIG. 3, one embodiment of an automatic braking system 9 comprises a circuit or means 10 for acquiring deceleration rates Rd, together with a first functional circuit or module 11, a second functional circuit or module 12 and a third functional circuit or module 13. As shown, the acquisition means 10 and the functional modules are defined functionally. They perform sub-functions of the automatic braking function. In some embodiments, the sub-functions are implemented by the hardware and software components of the computer(s) of the automatic braking system 9.

The deceleration rates Rd acquired by the acquisition means 10 comprise for example the selected deceleration rate (i.e., the one actually used in the automatic braking system 9) and/or pre-determined deceleration rates, and/or dynamically calculated deceleration rates, and/or maximum deceleration rates, etc.

The acquisition means 10 can for example comprise a memory in which are stored the pre-determined deceleration rates and the maximum deceleration rates, and/or a signal receiver that acquires the selected deceleration rate or the dynamically calculated deceleration rates.

The first functional module 11, the second functional module 12 and the third functional module 13 are separate and are defined according to separate specifications. They are also independent: the functional modules are connected to each other and exchange data, for example, via communication links, but do not comprise any common submodules. In this embodiment, any change or amendment of one of the functional modules does not imply the changing of another functional module.

Figure 4:
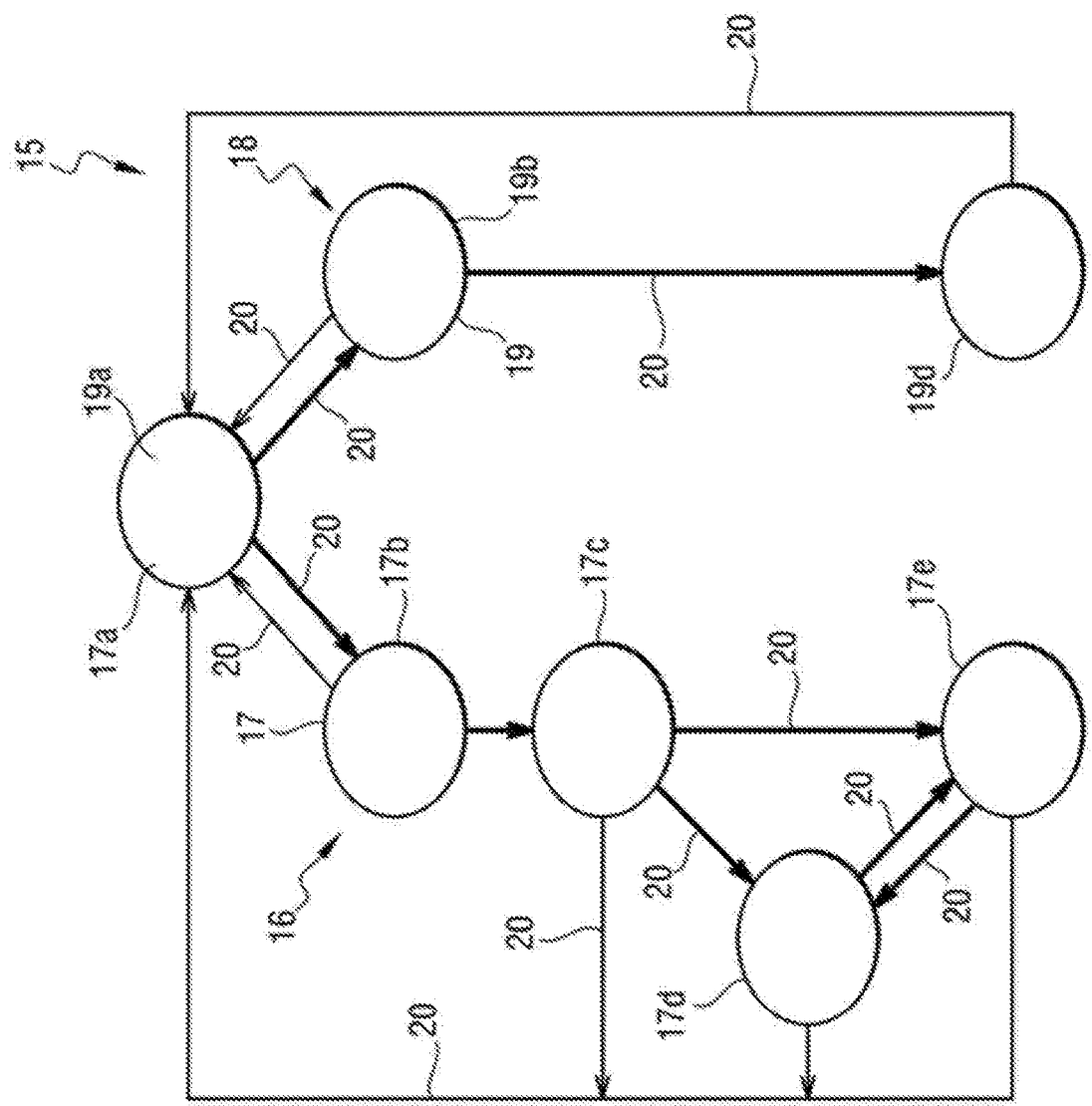
FIG. 4 shows a state machine implemented in an embodiment of the automatic braking system according to the disclosure.

With reference to FIG. 4, the first functional module 11 implements a state machine 15 that includes a first branch 16 comprising first states 17 corresponding to a landing of the airplane, and a second branch 18 comprising second states 19 corresponding to a rejected take-off, or RTO, of the airplane. The first states 17 are therefore used when a first automatic braking mode, corresponding to the landing of the airplane, is selected, and the second states 19 are therefore used when a second automatic braking mode, corresponding to a rejected take-off, is selected.

The first states 17 comprise, for example, a deactivated state 17a, a first activated state 17b, a pre-engaged state 17c, a first engaged state 17d, and a fully engaged state 17e. The fully engaged state 17e corresponds to an automatic braking command that makes it possible to produce maximum braking force in the event of the possibility of overrunning the runway during a landing.

The second states 19 comprise for example the deactivated state 19a (identical to the deactivated state 17a), a second activated state 19b, and a second engaged state 19d.

The state machine 15 also comprises transitions 20 between the first states 17 and between the second states 19.

In the embodiment shown, the first states 17, the second states 19 and the transitions 20 are defined independently of the deceleration rates Rd acquired by the acquisition means 10.

The transitions 20 depend on first conditions defined at least on the basis of external parameters Pex. The external parameters Pex are generated outside the automatic braking system 9, for example by sensors of the airplane, and are acquired by the automatic braking system 9.

The external parameters Pex are representative of a state of the airplane. The external parameters Pex comprise measured or estimated data and characterize the state of the airplane. The external parameters Pex are representative for example of the speed of the airplane, speeds of the wheels of the airplane, a risk of the airplane overrunning the runway, the occurrence of a rejected take-off, a position on the ground or in flight of the airplane, etc. The external parameters Pex are acquired via the acquisition of variables representative of the values of the external parameters.

In the nominal case of a landing of the airplane, a transition 20 from the deactivated state 17a to the first activated state 17b thus occurs when the airplane is in flight before its landing and a pilot of the airplane selects a valid automatic braking mode, i.e., the first automatic braking mode, which corresponds to the landing of the airplane. The variables In_Flight and Autobrake_Selection (which correspond to the first automatic braking mode), acquired by the automatic braking system 9, respectively make it possible to check that these two first conditions are met.

A transition 20 from the first activated state 17b to the pre-engaged state 17c occurs when the airplane touches down, and differences between speeds of most of the wheels of the airplane and a speed of the airplane are less than or equal to a first pre-determined speed threshold, and an automatic braking order is received. The variables On_Ground, Global_Spun_Up and Autobrake_Activation, acquired by the automatic braking system 9, respectively make it possible to check that these three first conditions are met. The variable Autobrake_Activation appears or adopts a value corresponding to the activation of the automatic braking when a deployed spoiler signal is produced or when an engine lever is in the idle position.

A transition 20 from the pre-engaged state 17c to the first engaged state 17d occurs when the airplane is stabilized on the ground. The variable Nose_On_Ground, acquired by the automatic braking system 9, makes it possible to check that this first condition is met. This variable appears or adopts a value corresponding to the stabilization of the airplane when a nose on ground signal, indicating that the auxiliary (front) landing gear is on the ground, is received and confirmed.

A transition 20 from the pre-engaged state 17c or the first engaged state 17d to the fully engaged state 17e occurs when a risk of the airplane overrunning the runway is detected (Runway_Overrun_Protection variable). A transition 20 from the fully engaged state 17e to the first engaged state 17d occurs when the risk disappears (disappearance of the Runway_Overrun_Protection variable).

In the event of a rejected take-off, a transition 20 from the deactivated state 19a to the second activated state 19b occurs before a take-off run of the airplane when a pilot of the airplane selects a valid automatic braking mode, i.e., the second automatic braking mode, which corresponds to the rejected take-off of the airplane.

The variables On_Ground (or not In_Flight) and Autobrake_Selection (which correspond to the second automatic braking mode), acquired by the automatic braking system 9, make it possible to check that these first conditions are met.

A transition 20 from the second activated state 19b to the second engaged state 19d occurs when an automatic braking order is received, and a speed of the airplane is greater than or equal to a second pre-determined speed threshold. The variables Autobrake_Activation and Aircraft_Speed are respectively used. The variable Autobrake_Activation appears or adopts a value corresponding to the activation of the automatic braking when a deployed spoiler signal is produced or when an engine lever is in the idle position.

In the first automatic braking mode and the second automatic braking mode, a transition 20 from the pre-engaged state 17c or the first engaged state 17d or the fully engaged state 17e or the second engaged state 19d to the deactivated state 17a, 19a occurs when a pilot of the airplane resumes manual control by exerting pressure on the brake pedals that is greater than a pre-determined pressure threshold, or if the airplane takes off and the main landing gear of the airplane is no longer touching the ground. The variable Main_Landing_Gear_On_Ground is used for this last condition.

In the first automatic braking mode and the second automatic braking mode, a transition 20 from any particular state belonging to the first states 17 or to the second states 19 to the deactivated state 17a, 19a occurs when a fault in equipment contributing to the implementation of the automatic braking occurs, or when a pilot of the airplane manually deactivates automatic braking.

The variable Autobrake Fault is used for the fault. The fault is calculated in an external module that takes into account invalid signals used in the automatic braking functions, loss of performance and asymmetrical braking. The variable Autobrake_Selection is used for manual deactivation (deactivation is detected when this variable adopts the value OFF).

The first functional module 11 has as an output an automatic braking status Sab (Autobrake variable), which corresponds to a current state of the state machine 15. The current state is either one of the first states 17 or one of the second states 19. The current state changes in real time as a function of the meeting of the first conditions upon which the transitions 20 depend.

The second functional module 12 defines a target deceleration Td of the airplane at least on the basis of the deceleration rates Rd, the current state of the state machine 15, and the external parameters Pex. The second functional module 12 generates the target deceleration Td so that the selected deceleration rate is achieved in as short a time as possible, while ensuring the comfort of the passengers on the airplane.

Figure 5:
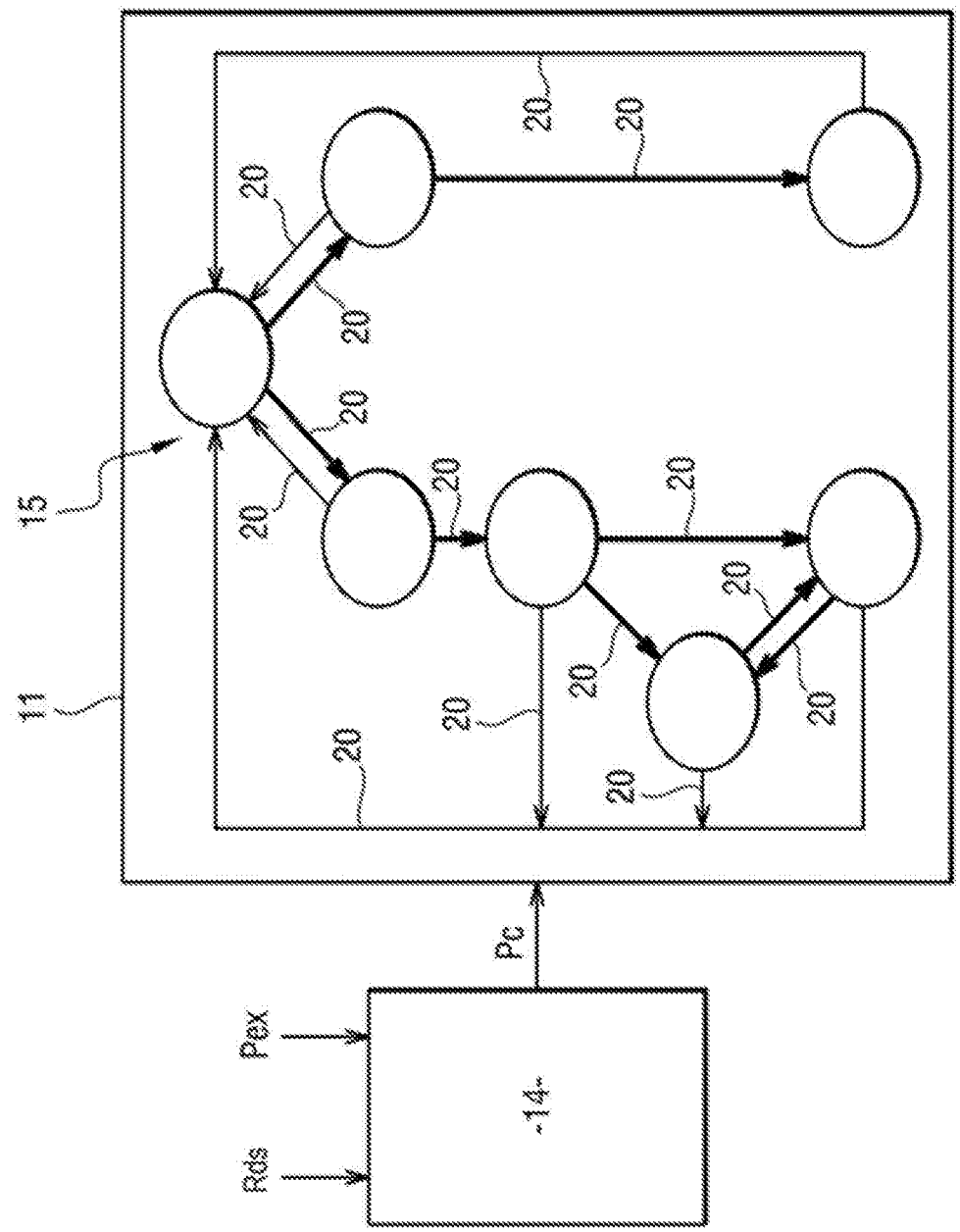
FIG. 5 shows the state machine in FIG. 4 and a fourth functional module of the automatic braking system according to an embodiment of the disclosure.

The third functional module 13 is used in order to generate, at least on the basis of the current state and the target deceleration Td, an automatic braking command Comm in order to control the brakes on the wheels of the airplane. Here, the automatic braking command Comm is a pressure command With reference to FIG. 5, the automatic braking system according to the disclosure 9 can also comprise a fourth functional module 14. The fourth functional module 14 is optional.

In the event that the fourth functional module 14 is used, it is positioned at the input to the first functional module 11. The fourth functional module 14 is used to produce consolidated parameters Pc at least on the basis of the external parameters Pex and the deceleration rates Rd and, in particular, on the basis of the selected deceleration rate Rds (which is one of the deceleration rates Rd and has been chosen by the pilot or automatically by a system of the airplane).

The fourth functional module 14 is used in very specific cases in which the transition from one state 17, 19 to the other necessarily depends on the selected deceleration rate Rds.

In order to avoid the transitions 20 depending directly on the selected deceleration rate Rds, the transitions 20 are made to depend on second conditions defined on the basis of the consolidated parameters Pc.

For example, in certain types or families of airplane, some of the external parameters Pex that have just been mentioned, representative of the state of the airplane, are thus unavailable. In this case, the fourth functional module 14 replaces these external parameters Pex with values that depend on the selected deceleration rate Rds, and thus produces the consolidated parameters Pc.

Similarly, for example, in the event of variable deceleration rates as a function of the exit taxiway selected, the selected deceleration rate Rds is calculated dynamically by an external module. The fourth functional module 14 does not only operate on the basis of external parameters Pex originating from sensors, but consolidates the external parameters as a function of the selected deceleration rate Rds in order to obtain the consolidated parameters Pc.

The fourth functional module 14 then transmits the consolidated parameters Pc to the first functional module 11. The consolidated parameters Pc are used to define the second conditions upon which the transitions 20 depend.

Of course, the disclosure is not limited to the embodiments described but encompasses any variant that falls within the scope of the disclosure as defined by the claims.

Embodiments of the automatic braking system are described herein as working in conjunction with a hydraulic braking system. The automatic braking system according to the disclosure could work in conjunction with a different braking system, for example an electric braking system. The automatic braking system can be completely incorporated into the hydraulic or electric braking system and, in particular, be implemented in one or more braking computers of the hydraulic or electric braking system.

The automatic braking command is of course not necessarily a pressure command, but could be a different command, for example a current (in the case of an electric braking system), a torque, a movement of the actuator push rods, etc.

As briefly mentioned above, certain embodiments disclosed herein utilize circuitry (e.g., one or more circuits) in order to implement standards, protocols, methodologies or technologies disclosed herein, operably couple two or more components, generate signals or information, process signals or information, analyze signals or information, encode/decode signals or information, convert signals or information, transmit and/or receive signals or information, control other devices, etc. Circuitry of any type can be used. Such circuitry or a circuit thereof may be, for example, part of the modules, computers or state machines described herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft automatic braking system, comprising
   acquisition means for acquiring deceleration rates suitable for being imparted to the aircraft by the automatic braking system, and
   a plurality of separate functional modules comprising
      a first functional module defining an automatic braking status, the first functional module being arranged in order to implement a state machine that includes a first branch comprising first states corresponding to a landing of the aircraft, a second branch comprising second states corresponding to a rejected take-off of the aircraft, and transitions between the first states and the second states, the first states, the second states and the transitions being defined independently of the deceleration rates, thereby enabling the deceleration rates to be changed without changing the state machine, the transitions depending on external parameters generated outside the automatic braking system;
      a second functional module arranged in order to define a target deceleration of the aircraft on the basis of at least the deceleration rates and a current state of the state machine, the current state being either one of the first states or one of the second states; and
      a third functional module arranged in order to define, on the basis of at least the current state and the target deceleration, an automatic braking command in order to control actuators of wheel brakes of the aircraft.

2. The automatic braking system according to claim 1, wherein the automatic braking system being arranged in order to acquire external parameters generated outside the automatic braking system and representative of a state of the aircraft, the transitions depending on first conditions defined on the basis of at least the external parameters.

3. The automatic braking system according to claim 2, wherein the second functional module is arranged in order to define the target deceleration by also using the external parameters.

4. The automatic braking system according to claim 2, comprising a fourth functional module arranged in order to produce consolidated parameters on the basis of at least the external parameters and a selected deceleration rate chosen from the deceleration rates, the state machine comprising at least one transition depending on second conditions defined on the basis of at least the consolidated parameters.

5. The automatic braking system according to claim 1, wherein the first states comprise a deactivated state, a first activated state, a pre-engaged state, a first engaged state, and a fully engaged state.

6. The automatic braking system according to claim 1, wherein the second states comprise the deactivated state, a second activated state, and a second engaged state.

7. The automatic braking system according to claim 5, wherein a transition from the deactivated state to the first activated state occurs when the aircraft is in flight before the landing of the aircraft and a pilot of the aircraft selects a first automatic braking mode corresponding to the landing of the aircraft.

8. The automatic braking system according to claim 5, wherein a transition from the first activated state to the pre-engaged state occurs when the aircraft touches down, and differences between speeds of most of the wheels of the aircraft and a speed of the aircraft are less than or equal to a first pre-determined speed threshold, and an automatic braking order is received.

9. The automatic braking system according to claim 5, wherein a transition from the pre-engaged state to the first engaged state occurs when the aircraft is stabilized on the ground.

10. The automatic braking system according to claim 5, wherein a transition from the pre-engaged state or the first engaged state to the fully engaged state occurs when a risk of the aircraft overrunning the runway is detected, and in which a transition from the fully engaged state to the first engaged state occurs when said risk disappears.

11. The automatic braking system according to claim 6, wherein a transition from the deactivated state to the second activated state occurs before a take-off run of the aircraft when a pilot of the aircraft selects a second automatic braking mode corresponding to a rejected take-off of the aircraft.

12. The automatic braking system according to claim 6, wherein a transition from the second activated state to the second engaged state occurs when an automatic braking order is received, and a speed of the aircraft is greater than or equal to a second pre-determined speed threshold.

13. The automatic braking system according to claim 5, wherein a transition from the pre-engaged state or the first engaged state or the fully engaged state or the second engaged state to the deactivated state occurs when a pilot of the aircraft exerts pressure on brake pedals that is greater than a pre-determined pressure threshold, or if the aircraft takes off and landing gear of the aircraft is no longer touching the ground.

14. The automatic braking system according to claim 5, in which a transition from any particular state belonging to the first states or to the second states to the deactivated state occurs when a fault in equipment contributing to the implementation of the automatic braking occurs, or when a pilot of the aircraft manually deactivates automatic braking.

15. An automatic braking system of an aircraft, comprising
    a first functional module defining an automatic braking status, the first functional module being arranged in order to implement a state machine that includes a first branch comprising first states corresponding to a landing of the aircraft, a second branch comprising second states corresponding to a rejected take-off of the aircraft, and transitions between the first states and the second states, the first states, the second states and the transitions being defined independently of deceleration rates of the aircraft, thereby enabling the deceleration rates to be changed without changing the state machine, the transitions depending on external parameters generated outside the automatic braking system;
    a second functional module arranged in order to define a target deceleration of the aircraft on the basis of at least the deceleration rates and a current state of the state machine, the current state being either one of the first states or one of the second states; and
    a third functional module arranged in order to define, on the basis of at least the current state and the target deceleration, an automatic braking command in order to control actuators of wheel brakes of the aircraft.

16. An automatic braking system, comprising:

acquisition means for acquiring deceleration rates suitable for being imparted to the aircraft by the automatic braking system, and a plurality of separate functional modules comprising a first functional module arranged in order to implement a state machine that includes a first branch comprising first states corresponding to a landing of the aircraft, a second branch comprising second states corresponding to a rejected take-off of the aircraft, and transitions, the first states, the second states and the transitions being defined independently of the deceleration rates;

a second functional module arranged in order to define a target deceleration of the aircraft on the basis of at least the deceleration rates and a current state of the state machine, the current state being either one of the first states or one of the second states; and a third functional module arranged in order to define, on the basis of at least the current state and the target deceleration, an automatic braking command in order to control actuators of wheel brakes of the aircraft, wherein the first states comprise a deactivated state, a first activated state, a pre-engaged state, a first engaged state, and a fully engaged state, and wherein a transition from the first activated state to the pre-engaged state occurs when the aircraft touches down, and differences between speeds of most of the wheels of the aircraft and a speed of the aircraft are less than or equal to a first pre-determined speed threshold, and an automatic braking order is received.

\* \* \* \* \*